United States Patent Office 3,013,894
Patented Dec. 19, 1961

3,013,894
COAL ACID COATED PARTICULATE FOAMABLE STYRENE POLYMER COMPOSITIONS
Ronald H. Cooper, Clare, Mich., assignor to The Dow Chemical Company, Midland, Mich., a corporation of Delaware
No Drawing. Filed Feb. 10, 1960, Ser. No. 7,763
2 Claims. (Cl. 117—33)

This invention relates to coated particulate foamable styrene polymer compositions and to a method of preparing the same. It relates more particularly to coated foamable styrene polymer compositions in granular forms which are adapted to be employed in the fabrication or manufacture of shaped cellular bodies by expansion or foaming in a porous mold.

Foamable styrene polymer compositions comprising the normally solid styrene polymer in granular or particulate form having a volatile organic fluid such as pentane, hexane, heptane, petroleum ether and the like uniformly dispersed throughout as foaming agent, and methods of making the compositions are known. It is known to expand such styrene polymer compositions by heating the same in a porous mold to produce a cellular body or article conforming to the shape of the mold.

However, one disadvantage of the foamable sytrene polymer composition is that upon prolonged storage at ordinary conditions, i.e. at room temperature and atmospheric pressure, the particles of the polymer tend to lose an appreciable proportion of the volatile organic foaming agent contained therein so that unless the foamable compositions are used for their intended purpose within a reasonable time, e.g. two weeks or less, from the date of their preparation or manufacture, the compositions when foamed expand to form cellular products having a greater density and a lesser foam volume than is desired.

The problem of preventing the gradual loss of the foaming agent by diffusion of the volatile compound from within the individual particles into the atmosphere, is particularly troublesome in storing and shipping of the foamable composition.

Accordingly, it is a primary object of the invention to provide novel coated particulate foamable styrene polymer compositions which contain their foaming characteristic for prolonged periods of time when stored at ordinary temperature and pressure conditions. Another object is to provide a method and agents for coating particulate foamable styrene polymer compositions which coating inhibits or prevents loss of the volatile foaming agent from the styrene polymer granules. Still another object is to provide free-flowing non-tacky coated particulate foamable styrene polymer compositions which can be stored at ordinary temperatures and pressure for prolonged periods of time without appreciable loss of the foaming agent, and which coated particles are adapted to be employed in the manufacture of cellular bodies composed for the most part of uniformly small thin-walled individually-closed cells. Other and related objects may appear from the following description of the invention.

According to the invention, the loss of a volatile organic foaming agent from particulate foamable styrene polymer compositions can readily be inhibited or prevented by applying to the surface of the styrene polymer granules a coating of a small but effective amount of coal acids sufficient to produce a continuous or substantially continuous layer of said coal acids uniformly distributed over the surfaces of the granules and thereafter neutralizing the coal acids with magnesium oxide.

The magnesium oxide to be employed is advantageously finely divided magnesium oxide having an initial setting time between 0.5 and 3 hours as determined by procedure described in ASTM C254–50T and has particles of sizes finer than 40 mesh per inch as determined by U.S. Standard screens. Such magnesium oxide usually dries the resin particles coated with an aqueous 50 weight percent solution of the coal acids in about 10 to 15 minutes at ordinary conditions, i.e. room temperature and atmospheric pressure.

The coal acids to be employed in the invention are a complex mixture of polyfunctional aromatic acids, including benzene, naphthalene and biphenyl as the principal aromatic nuclei in their composition. They are obtained by the oxidation with gaseous oxygen or air of an aqueous alkaline slurry of a finely divided carbonaceous material such as bituminous coal, or coke that has been obtained by the carbonization of coal at temperatures below 700° C., by oxidizing the finely divided coal or coke in the aqueous alkaline medium at temperatures of about 290° C. and 1,800 pounds per square inch gauge pressure. Coal acids are described in Chem. and Eng. News, pages 96 and 98 (September 28, 1959), and in U.S. Patent No. 2,887,399.

The coal acids are a hydroscopic, usually yellowish, essentially water-soluble material comprised of various aromatic polycarboxylic acids having an average molecular weight of about 270, the average equivalent weight being about 80, and which contain an average of about 3.3 carboxylic acid groups per molecule. The coal acids are employed in amounts corresponding to from about 2 to about 8, preferably from 3 to 6, percent by weight, based on the weight of the particulate foamable styrene polymer composition to be treated.

The magnesium oxide to be employed in the invention is preferably calcined magnesium oxide in a finely divided or powdered form so as to provide a maximum surface area for neutralizing the coal acids and a faster drying rate with a minimum amount of the magnesium oxide. The magnesium oxide is employed in proportions corresponding to from about 2 to 20 percent by weight based on the weight of the coal acids employed.

The styrene polymer granules can be prepared in known ways such as by polymerizing the monomer in admixture with a volatile organic compound, e.g. pentane or dichlorodifluoromethane, while dispersed in an aqueous medium. The foamable styrene polymer granules are preferably of sizes of from about 10 to 100 mesh per inch or finer as determined by U.S. Standard screens.

In practice, the coal acids are coated onto the surfaces of the particulate foamable styrene polymer compositions by dissolving the coal acids in water or an aqueous solution of water and a water-miscible solvent such as methanol, ethanol, isopropanol or n-propanol, suitably in a concentration of from about 25 to 60 percent by weight of the coal acids, and tumbling or blending a mixture of the particulate styrene polymer composition and the solution of the coal acids at room temperature or thereabout to uniformly distribute the coal acids over the surfaces of the polymer particles in the desired proportion. Thereafter, the finely divided magnesium oxide is added preferably by sprinkling or dusting the finely divided material onto the blend while it is being tumbled to uniformly distribute the magnesium oxide throughout the mixture. The coated styrene polymer granules are then dried at temperatures not greater than about 40° C. and are found to be free-flowing non-tacky granules suitable for expanding in a mold to produce cellular articles.

The coated styrene polymer compositions of the invention are stable compositions which can be stored at ordinary temperatures and pressure for prolonged periods of time without appreciable loss of the volatile foaming agent. If desired, the coating of the coal acids can readily be removed by washing the resin granules with water at room temperature or thereabout, after which the resin granules can be foamed in usual ways to produce cellular articles.

The following examples illustrate ways in which the principle of the invention has been applied but are not to be construed as limiting its scope.

EXAMPLE 1

Polystyrene in the form of beads of sizes between 10 and 30 mesh per inch as determined by U.S. Standard screens and containing 12 percent by weight of dichlorodifluoromethane as foaming agent, which polystyrene beads were prepared by polymerizing monomeric styrene while dispersed as droplets in an aqueous medium in admixture with the dichlorodifluoromethane under pressure, was placed in an open glass bottle and stored at room temperature and at atmospheric pressure for a period of 3 months. Thereafter, the beads were analyzed and found to contain only 7.46 percent by weight of dichlorodifluoromethane.

In accordance with the invention, a charge of 93.5 parts by weight of the same batch of the polystyrene beads containing 12 percent by weight of dichlorodifluoromethane as initially prepared was blended with 12 parts by weight of an aqueous 50 weight percent solution of coal acids until the beads were uniformly coated with the solution then were mixed with 1.5 parts by weight of finely divided magnesium oxide and dried in air at room temperature. The coated polystyrene beads were free-flowing and non-tacky particles. A quantity of the coated beads was placed in an open glass bottle and stored at room temperature and atmospheric pressure for a period of 3 months. Thereafter the coated beads were analyzed and found to contain 10.71 percent by weight of dichlorodifluoromethane. The loss of dichlorodifluoromethane foaming agent from the coated beads was only 1.29 percent, whereas the loss of foaming agent from the uncoated beads upon storing was 4.54 percent.

EXAMPLE 2

Polystyrene beads of sizes between 20 and 40 mesh per inch as determined by U.S. Standard screens, which polystyrene beads were prepared by polymerizing monomeric styrene while dispersed as droplets in an aqueous medium in admixture with 7 percent by weight of n-pentane as foaming agent under pressure, were, in separate experiments, blended with an aqueous solution containing 53 percent by weight of coal acids in amounts corresponding to 6 and 8 percent of the coal acids based on the weight of the polystyrene beads, then were blended with 0.6 percent of finely divided calcined magnesium oxide. The coated polystyrene beads were free-flowing and non-tacky. A charge of each of the coated beads, and for comparison, a charge of the uncoated polystyrene beads was placed in an open glass bottle and stored at room temperature and atmospheric pressure for a period of time as stated in the following table. Thereafter, a portion of the stored beads was removed and foamed by placing them in hot water at 95–98° C. for a period of 5 minutes after which the foamed product was removed and its density determined. Table I identifies the experiments and gives the percent by weight of coal acids and magnesium oxide that was coated onto the polystyrene beads. The table also gives the percent by weight of foaming agent in the stored or aged polystyrene beads and the density of the foamed product prepared from the stored beads.

Table I

| Run No. | Coal Acids, Percent | MgO, Percent | Polystyrene Beads, Percent | After 67 Days | | After 102 Days | |
|---|---|---|---|---|---|---|---|
| | | | | Foaming Agent, Percent | Foam Density, lbs./cu. ft. | Foaming Agent, Percent | Foam Density, lbs./sq. ft. |
| 1 | | | 100 | 4.41 | 1.59 | 3.99 | 2.19 |
| 2 | 6 | 0.6 | 93.4 | 6.33 | 1.00 | 5.92 | 1.35 |
| 3 | 8 | 0.6 | 91.4 | 6.13 | 1.25 | 5.58 | 1.46 |

The method of the present invention can be used to inhibit or prevent the loss of volatile foaming agent from foamable styrene polymer compositions such as the thermoplastic normally solid resinous homopolymers and copolymers containing in chemically combined or interpolymerized form at least 70 percent by weight of a styrene compound having the general formula:

$$Ar-\underset{\underset{R}{|}}{C}=CH_2$$

wherein Ar represents an aromatic radical of the group consisting of hydrocarbon and nuclear substituted halohydrocarbon radicals of the benzene series and R represents hydrogen or the methyl radical, and not more than 30 percent by weight of one or more other ethylenically unsaturated organic compounds copolymerizable therewith such as methyl methacrylate, acrylonitrile; copolymers of at least 99.5 percent by weight of at least one such styrene compound and not more than 0.5 percent of divinylbenzene; and copolymers of at least 90 percent by weight of at least one such styrene compound and not more than 10 percent by weight of natural or a synthetic rubber, which resinous copolymers contain a volatile fluid organic foaming agent uniformly dispersed throughout.

I claim:
1. A method of treating a particulate foamable styrene polymer composition having incorporated therein a volatile organic compound as a foaming agent to inhibit loss of said volatile organic compound at ordinary temperatures and pressure, which method comprises sequentially coating a particulate foamable styrene polymer with (a) a liquid solution of coal acids in a non-solvent for the styrene polymer in amount corresponding to from 3 to 8 percent by weight of the coal acids, based on the weight of the styrene polymer composition initially used and (b) with a finely divided magnesium oxide in amount corresponding to from 2 to 20 percent by weight of the magnesium oxide, based on the weight of the coal acids.

2. A coated particulate foamable styrene polymer having adhered to the surface thereof a mixture consisting of from 3 to 8 percent by weight of coal acids based on the weight of the styrene polymer, and from 2 to 20 percent by weight of magnesium oxide, based on the weight of the coal acids.

References Cited in the file of this patent

UNITED STATES PATENTS

| 2,120,549 | Dike | June 14, 1938 |
| 2,826,515 | Rickert et al. | Mar. 11, 1958 |
| 2,861,898 | Platzer | Nov. 25, 1958 |